United States Patent
Oh et al.

(10) Patent No.: US 8,325,242 B2
(45) Date of Patent: Dec. 4, 2012

(54) IMAGE STABILIZING APPARATUS AND IMAGE PICKUP APPARATUS HAVING THE SAME

(75) Inventors: Eui-kuen Oh, Suwon-si (KR);
Jang-hoon Yoo, Seoul (KR);
Yong-wook Kim, Suwon-si (KR);
Seong-ho Hwang, Suwon-si (KR);
Douk-young Song, Daejeon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 365 days.

(21) Appl. No.: 12/683,506

(22) Filed: Jan. 7, 2010

(65) Prior Publication Data

US 2010/0295952 A1 Nov. 25, 2010

(30) Foreign Application Priority Data

May 21, 2009 (KR) .............................. 2009-0044641

(51) Int. Cl.
*H04N 5/228* (2006.01)
(52) U.S. Cl. .................................. 348/208.11
(58) Field of Classification Search .............. 348/208.11
See application file for complete search history.

(56) References Cited

U.S. PATENT DOCUMENTS

| | | | | |
|---|---|---|---|---|
| 7,710,459 | B2 * | 5/2010 | Stavely | 348/208.99 |
| 7,783,179 | B2 * | 8/2010 | Takahashi | 396/55 |
| 7,912,361 | B2 * | 3/2011 | Lim et al. | 396/55 |
| 2007/0236577 | A1 * | 10/2007 | Ke et al. | 348/208.99 |
| 2008/0187301 | A1 * | 8/2008 | Takahashi | 396/55 |

* cited by examiner

*Primary Examiner* — James Hannett
(74) *Attorney, Agent, or Firm* — Stanzione & Kim, LLP

(57) ABSTRACT

An image stabilizing apparatus may include a fixing member disposed to a lens assembly having a through hole of which a center coincides with an optical axis of the lens assembly, a moving member disposed to move perpendicular to the optical axis with respect to the fixing member having a lens holder projecting in a direction of the optical axis to hold a compensating lens, a driving portion causing the moving member to move in a first direction perpendicular to the optical axis and in a second direction perpendicular to the optical axis and the first direction, four position determining portions formed in the first direction and the second direction on an outer circumferential surface of the lens holder of the moving member, and four stoppers projecting from an outer circumferential surface of the through hole of the fixing member to the moving member.

18 Claims, 11 Drawing Sheets

IMAGE STABILIZING APPARATUS AND IMAGE PICKUP APPARATUS HAVING THE SAME

CROSS-REFERENCE TO RELATED APPLICATIONS

This application claims priority under 35 U.S.C. §119(a) from Korean Patent Application No. 2009-0044641 filed May 21, 2009 in the Korean Intellectual Property Office, the disclosure of which is incorporated herein by reference in its entirety.

BACKGROUND

1. Field of the Invention

The present general inventive concept relates to an image pickup apparatus. More particularly, the present general inventive concept relates to an image stabilizing apparatus capable of compensating hand-shake of an image pickup apparatus to form a stable image and an image pickup apparatus having the same.

2. Description of the Related Art

Generally, an image pickup apparatus, such as a video camera, photographic apparatus, and a still camera, which takes moving images and/or still images using image sensors, such as a charge coupled device (CCD) sensor, a complementary metal oxide semiconductor (CMOS) sensor, etc., may take unstable images due to shake of the image pickup apparatus caused by external factors of the image pickup apparatus, such as hand-shake of an operator, vibration of a vehicle when photographing on the vehicle, etc. To prevent unstable images from being taken, apparatuses to compensate movement of the image pickup apparatus have been used. Hereinafter, the hand-shake of the image pickup apparatus is used as a meaning including various shake factors that may cause the image pickup apparatus to move when photographing, such as hand-shake of an operator when photographing, vibration of a vehicle when photographing on the vehicle, etc.

The apparatus that compensates movement of the image pickup apparatus to take stable images may have a hand-shake detecting portion and a hand-shake compensating portion.

The hand-shake detecting portion may be configured to use a method of detecting movement of the image pickup apparatus using various sensors, such as a gyro sensor. Alternatively, the hand-shake detecting portion may be configured to a method of sensing movement of images per frame using an image signal processing.

The hand-shake compensating portion may be configured to properly refract an incident light using a refractive compensating lens or to control an entering position of an image sensor according to the detected movement information of the image pickup apparatus, thereby removing unstable images and forming clear images.

Recently, image quality of image sensors used in the image pickup apparatus is enhanced, and the size of the image pickup apparatus is becoming smaller and smaller. Therefore, the hand-shake compensating portion may be required to have a structure that can allow an optical axis to be more precisely aligned and can allow a size thereof to be small.

SUMMARY

The present general inventive concept provides an image stabilizing apparatus that can minimize a deviation between an optical center of an image pickup apparatus and a mechanical center of the image stabilizing apparatus and can be formed in a smaller size, and an image pickup apparatus having the same.

Additional features and utilities of the present general inventive concept will be set forth in part in the description which follows and, in part, will be obvious from the description, or may be learned by practice of the general inventive concept.

Embodiments of the present general inventive concept can substantially be achieved by providing an image stabilizing apparatus usable with an image pickup apparatus, which may include a fixing member disposed to a lens assembly, the fixing member having a through hole of which a center coincides with an optical axis of the lens assembly; a moving member disposed to move perpendicular to the optical axis with respect to the fixing member, the moving member having a lens holder projecting in a direction of the optical axis in a hollow cylindrical shape to hold a compensating lens; a driving portion causing the moving member to move in a first direction perpendicular to the optical axis and in a second direction perpendicular to the optical axis and the first direction corresponding to a size of hand-shake; four position determining portions formed in the first direction and the second direction on an outer circumferential surface of the lens holder of the moving member; and four stoppers projecting from an outer circumferential surface of the through hole of the fixing member to the moving member, each of the four stoppers disposed outside each of the four position determining portions.

The position determining portions may include plane surfaces formed on portions of the outer circumferential surface of the lens holder.

Each of the stoppers may be formed to be in a line contact with each of the position determining portions.

The driving portion may include at least one magnet disposed on the moving member; at least one coil disposed on the fixing member to face the at least one magnet; and at least one yoke disposed in the fixing member below the at least one coil.

The at least one magnet may include first, second, third, and fourth magnets disposed outside each of the four position determining portions of the lens holder of the moving member, the first and second magnets may be disposed in the first direction, and the third and fourth magnets may be disposed in the second direction.

The yoke and coil may be formed to cause the moving member to linearly move in the first direction and in the second direction.

The yoke may be formed substantially in a bar shape, and the yoke is disposed so that a lengthwise direction thereof is parallel with a moving direction of the moving member.

A plurality of balls may be disposed between the moving member and the fixing member.

Movement of the moving member in the optical axis direction may be limited by the plurality of balls and a magnetic force between the at least one magnet and yoke.

The plurality of balls may be disposed on the moving member, and a plurality of ball contacting portions, which the plurality of balls contacts, may be formed on the fixing member.

The at least one coil may include first to fourth coils corresponding to the first to fourth magnets, and the first to fourth coils are formed integrally with a printed circuit board.

The image stabilizing apparatus may include a sensor detecting whether the position determining portions of the moving member contact the stopper of the fixing member.

The sensor may include a hall sensor.

The foregoing and/or other features and utilities of the present general inventive concept can also be achieved by providing an image pickup apparatus, which may include a lens assembly, an image stabilizing apparatus to compensate hand-shake of the image pickup apparatus, and an image sensor converting light passed through the lens assembly and the image stabilizing apparatus into electrical signals. The image stabilizing apparatus may include a fixing member disposed to the lens assembly, the fixing member having a through hole of which a center coincides with an optical axis of the lens assembly, a moving member disposed to move perpendicular to the optical axis with respect to the fixing member, the moving member having a lens holder projecting in a direction of the optical axis in a hollow cylindrical shape to hold a compensating lens, a driving portion causing the moving member to move in a first direction perpendicular to the optical axis and in a second direction perpendicular to the optical axis and the first direction corresponding to a size of the hand-shake, four position determining portions formed in the first direction and the second direction on an outer circumferential surface of the lens holder of the moving member, and four stoppers projecting from an outer circumferential surface of the through hole of the fixing member to the moving member, each of the four stoppers disposed outside each of the four position determining portions.

With the image stabilizing apparatus usable with an image pickup apparatus according to an exemplary embodiment of the present general inventive concept having a structure as described above, a center of a compensating lens may be determined by position determining portions formed on the outer circumferential surface of a lens holder of a moving member in which the compensating lens is disposed and stoppers formed on the outer circumferential surface of a through hole of a fixing member. The stoppers may be formed on the outer circumferential surface of the through hole formed coaxially with an optical axis that is an optical center of the image pickup apparatus, and the lens holder is formed so that the center thereof coincides with an optical center of the compensating lens. Therefore, determination of the center of the compensating lens using the stoppers and position determining portions of the lens holder may provide precise alignment between the center of the compensating lens and the optical center of the image pickup apparatus.

Furthermore, with the image stabilizing apparatus usable with an image pickup apparatus according to an exemplary embodiment of the present general inventive concept, the position determining portions may determine a mechanical center of the compensating lens is formed on the outer circumferential surface of the lens holder of the moving member and the stoppers may determine the position of the position determining portions are formed on the outer circumferential surface of the through hole of the fixing member. Therefore, the size of the image stabilizing apparatus may easily be minimized.

Embodiments of the present general inventive concept further include a vibration reduction unit usable with a photographic apparatus to stabilize images captured therein, including a securing mechanism attached to a lens assembly, where the lens assembly provides an optical axis at the center thereof, a movable mechanism to rotate about to the optical axis, where the movable mechanism includes a compensating lens positioned perpendicular and within the path of the optical axis, a power source to move the movable member in at least one direction perpendicular to the optical axis, where the movable mechanism is moved in proportion to vibration applied to the photographic apparatus, and at least four stoppers positioned on the securing mechanism to provide precise alignment between the center of the compensating lens and the optical center of the photographic apparatus.

Embodiments of the present general inventive concept further include an image stabilizing apparatus usable with an image pickup apparatus, comprising a fixing member having a lens assembly holding a lens, a moving member disposed to be movable with respect to the fixing member, and having a lens holder holding another lens, a driving portion formed at a position with the fixing member and the moving member to move the moving member with respect to the fixing member, and a plurality of stoppers formed on the fixing member between the lens and the driving portion.

BRIEF DESCRIPTION OF THE DRAWINGS

These and/or other features and utilities of the present general inventive concept will become apparent and more readily appreciated from the following description of the exemplary embodiments, taken in conjunction with the accompanying drawings in which:

FIGS. 10A and 10B illustrate centering of the moving member in an X axis direction, and FIGS. 10C and 10D illustrate centering of the moving member in a Y axis direction.

DETAILED DESCRIPTION OF THE EXEMPLARY EMBODIMENTS

Figure 1:
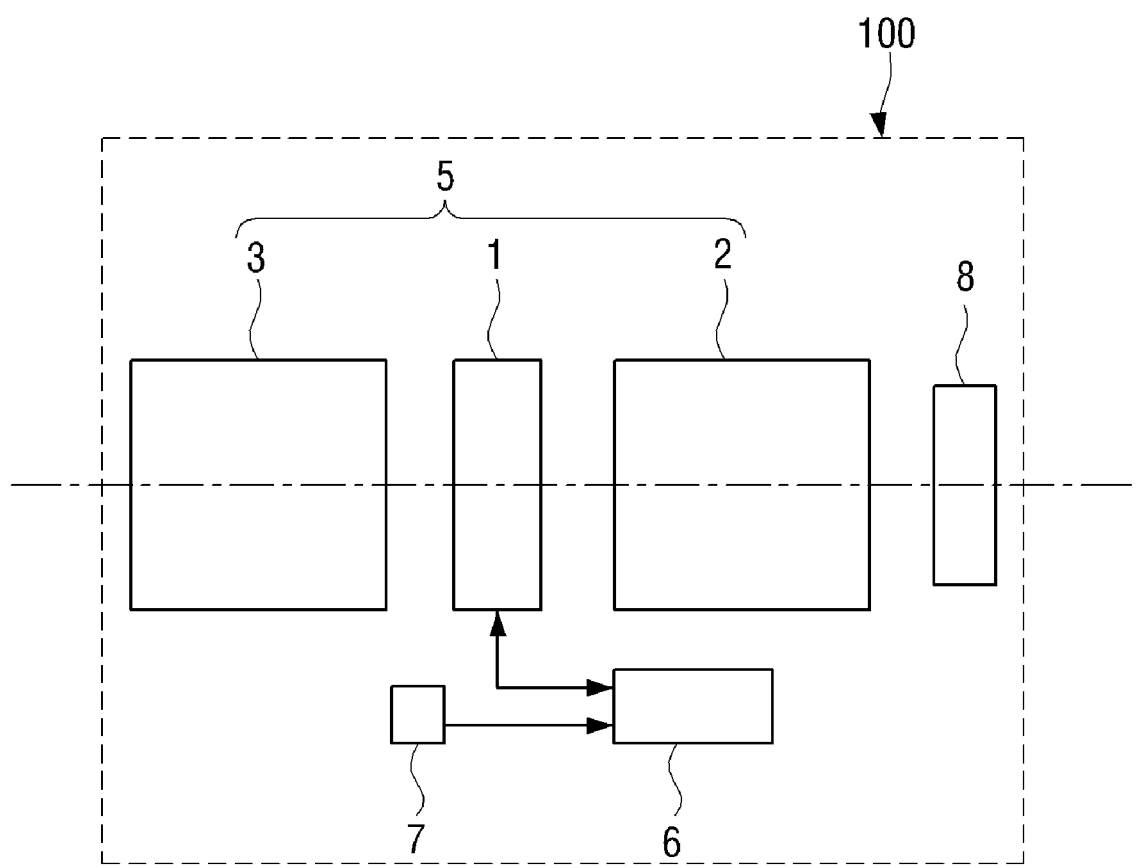
FIG. 1 is a block diagram illustrating an image pickup apparatus having an image stabilizing apparatus according to an exemplary embodiment of the present general inventive concept.

Reference will now be made in detail to the exemplary embodiments of the present general inventive concept, examples of which are illustrated in the accompanying drawings, wherein like reference numerals refer to the like elements throughout. The exemplary embodiments are described below in order to explain the present general inventive concept by referring to the figures.

The matters defined in the description, such as a detailed construction and elements thereof, are provided to assist in a comprehensive understanding of the present general inventive concept. Thus, it is apparent that the present inventive concept may be carried out without those defined matters. Also, well-known functions or constructions are omitted to provide a clear and concise description of exemplary embodiments herein.

Figure 2:
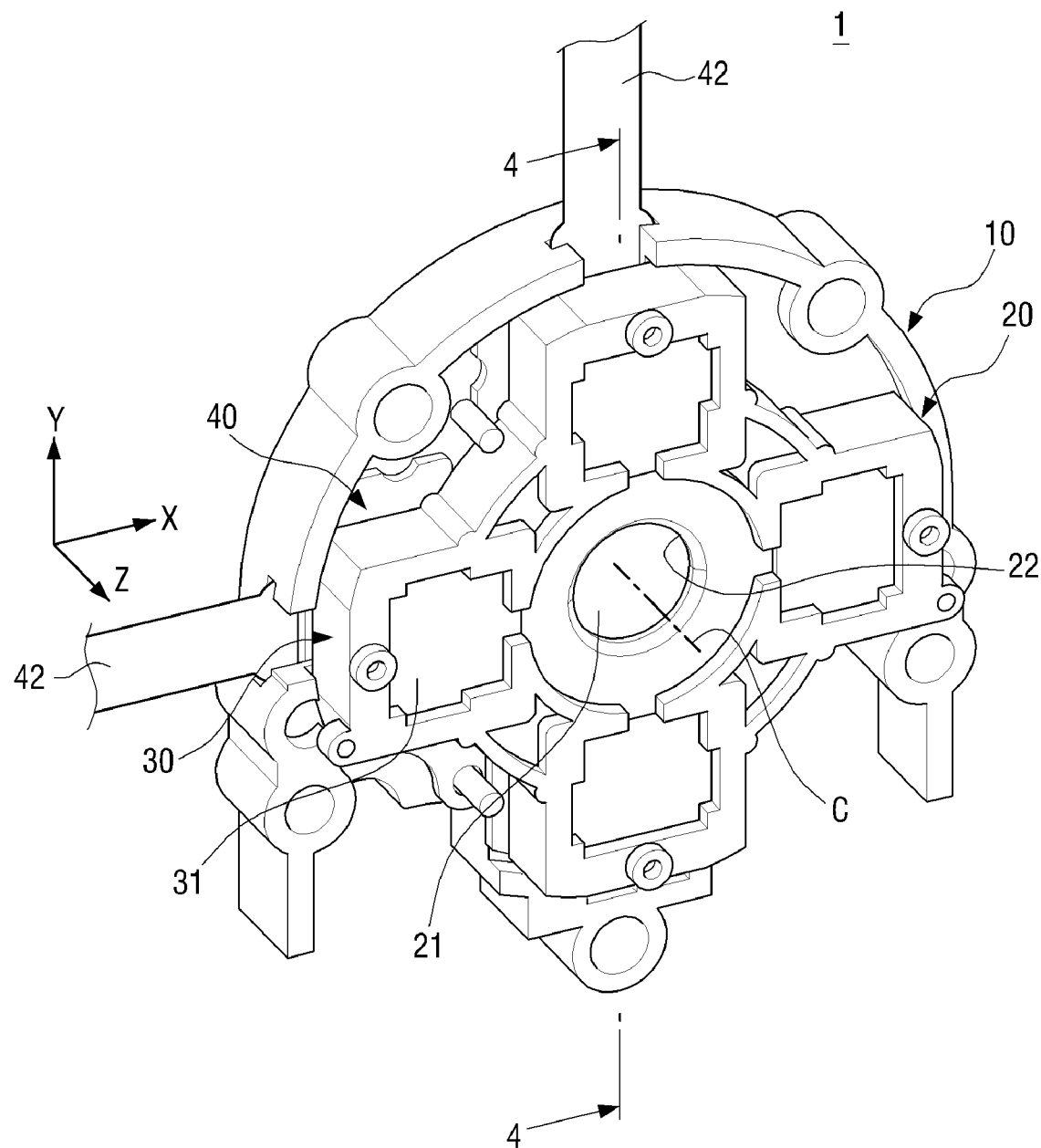
FIG. 2 is a perspective view illustrating an image stabilizing apparatus according to an exemplary embodiment of the present general inventive concept.
Figure 3:
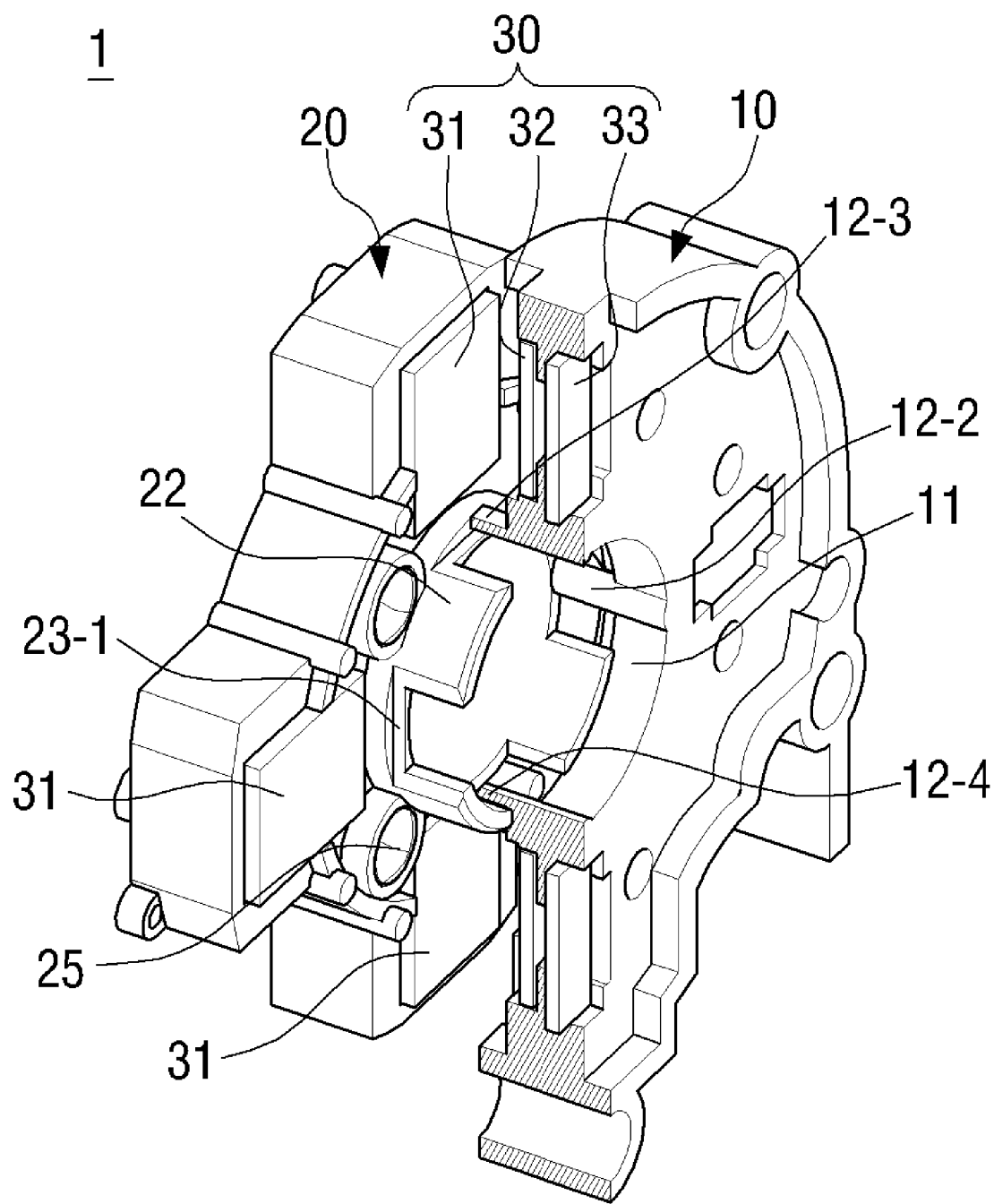
FIG. 3 is a perspective view illustrating the image stabilizing apparatus of FIG. 2 having a fixing member partially cut.
Figure 4:
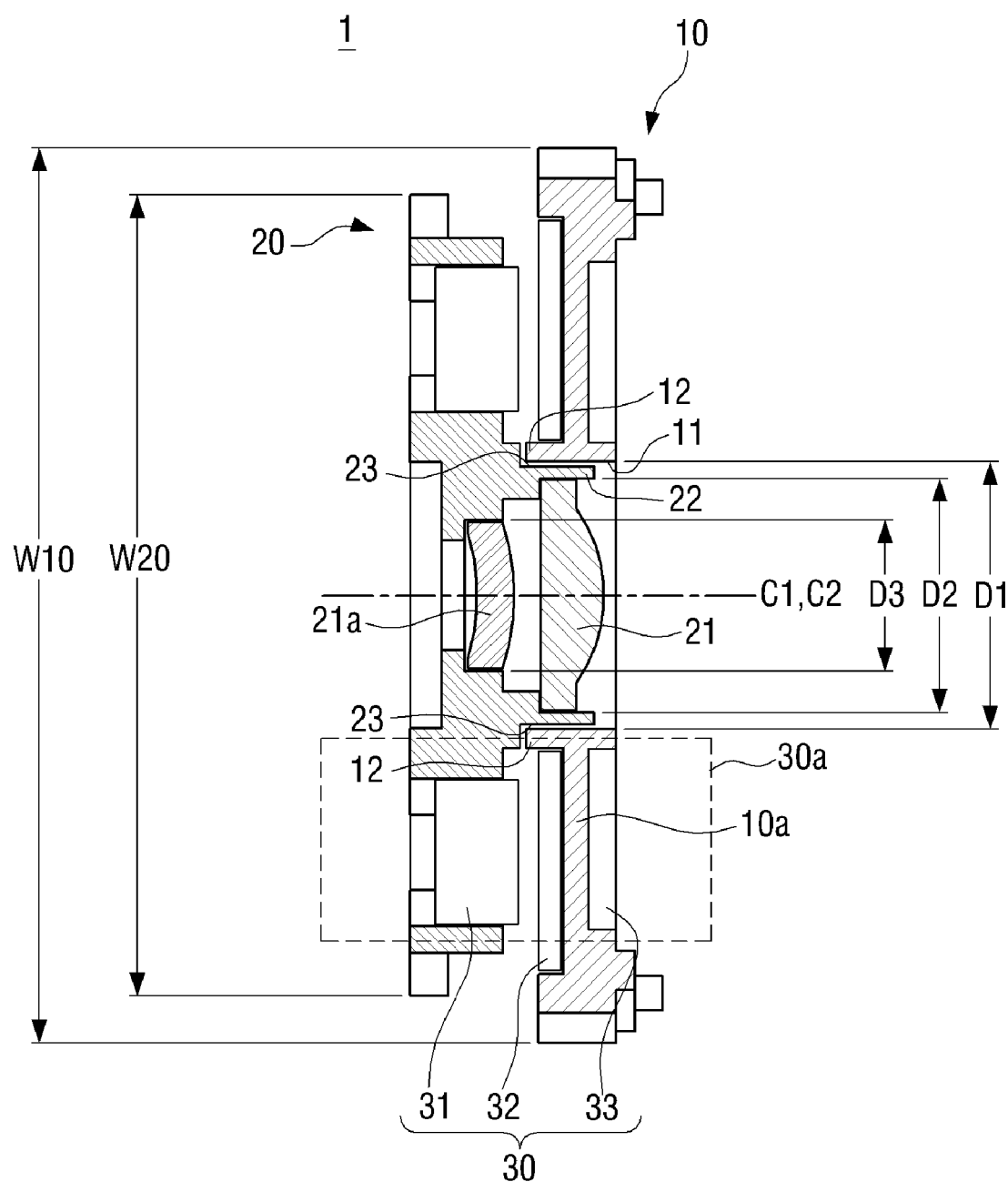
FIG. 4 is a sectional view illustrating the image stabilizing apparatus of FIG. 2 taken along a line 4-4 in FIG. 2.

FIG. 1 is a block diagram illustrating an image pickup apparatus 100 having an image stabilizing apparatus 1 according to an exemplary embodiment of the present general inventive concept. FIG. 2 is a perspective view illustrating the image stabilizing apparatus 1 according to an exemplary embodiment of the present general inventive concept. FIG. 3 is a perspective view illustrating the image stabilizing apparatus 1 of FIG. 2 having a fixing member 10 partially cut. FIG. 4 is a sectional view illustrating the image stabilizing apparatus 1 of FIG. 2 taken along a line 4-4 in FIG. 2.

Referring to FIG. 1, the image pickup apparatus 100 according to an exemplary embodiment of the present general inventive concept may include a lens assembly 5 and a control portion 6.

The lens assembly 5 may allow light reflected by an object to form an image on an image sensor 8, and may form a passage of light that enters the image pickup apparatus 100. The lens assembly 5 may include an object lens mount 3, an image sensor mount 2, and the image stabilizing apparatus 1.

An object lens may be disposed in the object lens mount 3. Also, in the object lens mount 3 may be disposed various lenses required to cause light from the outside to enter the image sensor 8 in addition to the object lens.

The image sensor 8 that can convert light into electric signals may be disposed at a position at which the light entering through the object lens forms an image of the object in the image sensor mount 2. Also, in the image sensor mount 2 may be disposed various lenses required to cause the light entering from the outside to form an image on the image sensor 8 in addition to the image sensor 8.

Furthermore, although not illustrated, in the lens assembly 5 may be disposed a zoom lens driving portion that allows the object lens to move in a direction of an optical axis.

The control portion 6 may control the image sensor 8, the image stabilizing apparatus 1, etc. so that the image pickup apparatus 100 can photograph the object and save the image of the object. Except for the method to control the image stabilizing apparatus 1, methods for the control portion 6 to control the image pickup apparatus 100 and to save images are the same or similar to those of a control portion of the conventional image pickup apparatus; therefore, the detailed descriptions thereof are omitted. If the image pickup apparatus 100 is vibrated by the hand-shake when taking a picture, the control portion 6 may detect movement of the image pickup apparatus 100 using a hand-shake detecting portion 7 having a sensor, such as a gyro sensor, etc., and may control the image stabilizing apparatus 1 as described below to compensate the movement of the image pickup apparatus 100 to form a stable image. The image stabilizing apparatus 1 may also be referred as a vibration reduction unit since, as stated above, the image stabilizing apparatus 1 may compensate the movement of the image pickup apparatus 100 to form a stable image.

Referring to FIGS. 2 through 4, the image stabilizing apparatus 1 usable with an image pickup apparatus according to an exemplary embodiment of the present general inventive concept may include the fixing member 10, a moving member 20, and a driving portion 30.

The fixing member 10 may allow the image stabilizing apparatus 1 to be fixed to the image pickup apparatus 100, and may be disposed in the lens assembly 5 of the image pickup apparatus 100. The fixing member 10 may be disposed between the image sensor mount 2 and the object lens mount 3 to allow the object lens mount 3, the image stabilizing apparatus 1, and the image sensor mount 2 to be fixed to one another.

A through hole 11 may be formed in the fixing member 10. The center C1 of the through hole 11 is aligned with an optical axis C of the lens assembly 5, that is, an optical center thereof. Light having passed the object lens mount 3 enters the image sensor mount 2 through the through hole 11 of the fixing member 10. The fixing member 10 may have a plurality of stoppers 12 projecting from an outer circumferential surface of the through hole 11 toward the moving member 20 in the direction of the optical axis. Four stoppers 12-1, 12-2, 12-3, and 12-4 may be formed at an angular interval of approximately 90 degrees to limit the moving member 20 from moving in first and second directions perpendicular to each other.

The fixing member 10 further includes a support portion 10a. The yoke 33 and magnet 32 are attached to or formed on the support portion 10a. The stoppers 12 are extended from one end of the support portion 10a.

The moving member 20 may hold a compensating lens 21 and may be disposed to move in a direction perpendicular to the optical axis C of the lens assembly 5 with respect to the fixing member 10. When an image formed on the image sensor 8 is shaken by the hand-shake, the compensating lens 21 may be formed to move with the moving member 20 to compensate the shake of the image formed on the image sensor 8. If necessary, a second compensating lens 21a may be disposed below the compensating lens 21, as illustrated in FIG. 4.

The width of the moving member 20 is defined by W20. The width of the fixing member 10 is defined by W10. The diameter of the through hole 11 is defined by D1. The diameter of the compensating lens 21 is defined by D2. The diameter of the second compensating lens 21a is defined by D3. Although slight variation to the diameters of the compensating lenses 21 and 21a may be tolerated, any variation to the diameters of the compensating lenses 21 and 21a must also consider placement of a lens holder 22 as well as the stoppers 12-1, 12-2, 12-3, and 12-4 and the position determining portions 23-1, 23-2, 23-3, and 23-4, since determination of the center of the compensating lens 21 may be determined using the stoppers and position determining portions of the lens holder 22 to provide precise alignment between the center of the compensating lens and the optical center of the image pickup apparatus.

Figure 6:
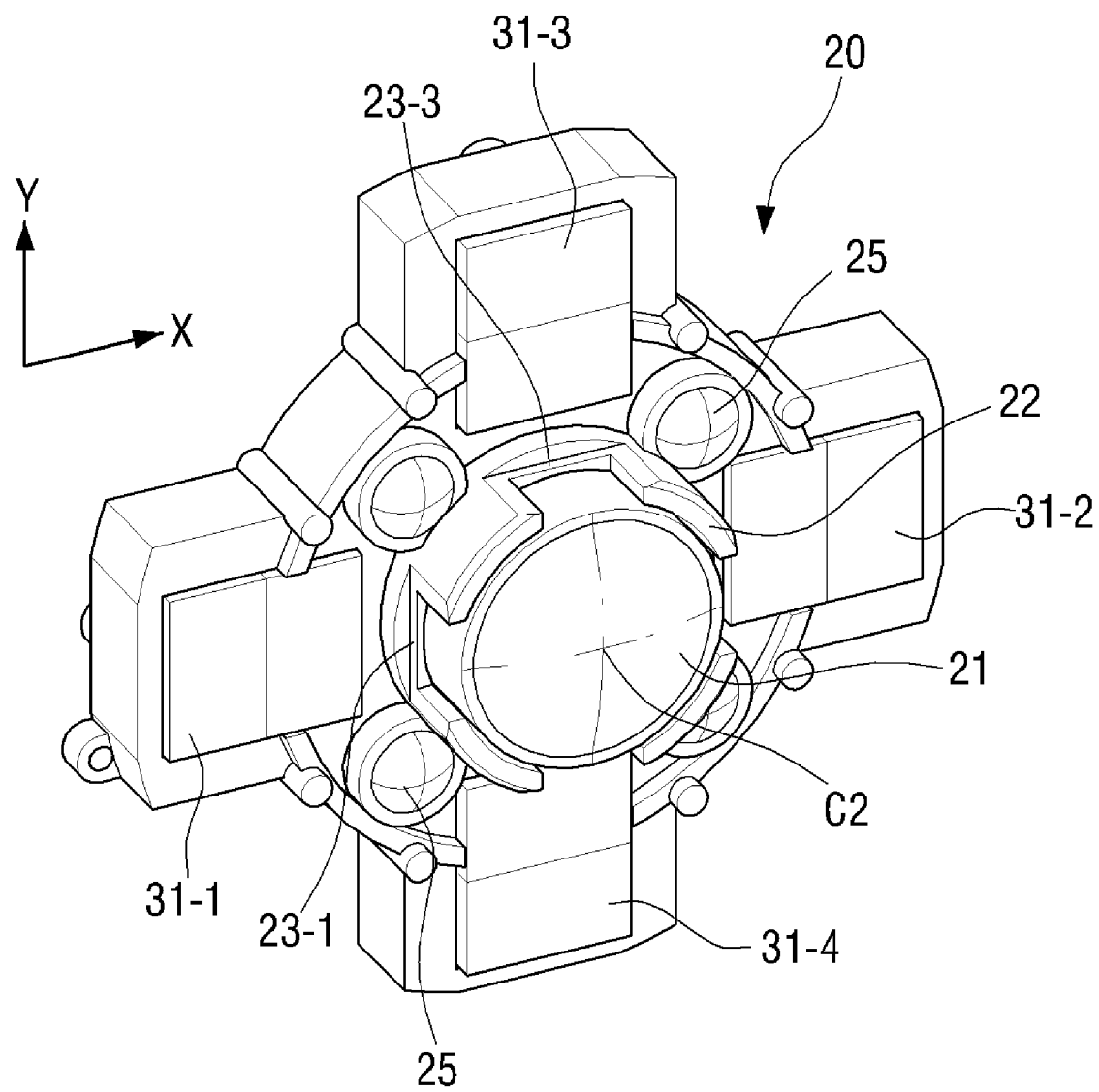
FIG. 6 is a perspective view illustrating a moving member of the image stabilizing apparatus of FIG. 2 being viewed from a side of a fixing member.
Figure 9:
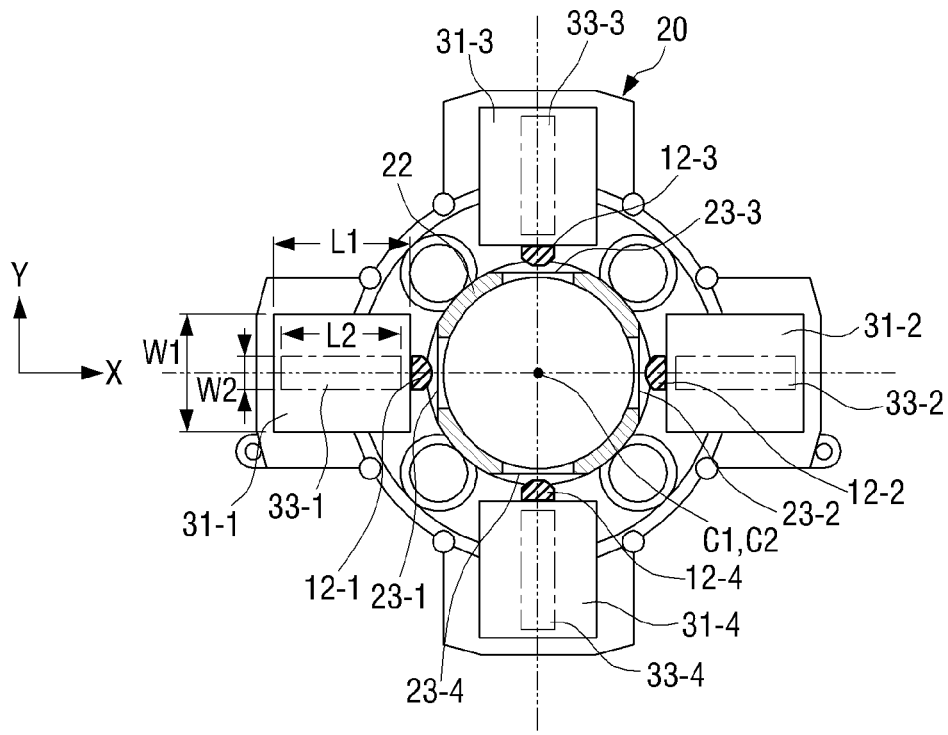
FIG. 9 is a view illustrating a state in that a center of a moving member is aligned with a center of a fixing member in an image stabilizing apparatus according to an exemplary embodiment of the present general inventive concept.

The moving member 20 may include the lens holder 22 that can hold the compensating lens 21. The lens holder 22 may project from the moving member 20 to the fixing member 10 in the direction of the optical axis C of the lens assembly 5, and may be formed substantially in a hollow cylindrical shape. Four position determining portions 23-1, 23-2, 23-3, and 23-4 may be formed at an angular interval of approximate 90 degrees on the outer circumferential surface of the lens holder 22 of the moving member 20, as illustrated in FIGS. 6 and 9. First and second position determining portions 23-1 and 23-2 may be formed in a first direction perpendicular to the optical axis C, for example, in an X axis direction of FIG. 6. Third and fourth position determining portions 23-3 and 23-4 may be formed in a second direction perpendicular to both the optical axis C and the first direction, for example, in a Y axis direction of FIG. 6. That is, the first and second position determining portions 23-1 and 23-2 may be formed at right and left sides of the lens holder 22 of FIG. 6. The third and fourth position determining portions 23-3 and 23-4 may be formed at up and down sides of the lens holder 22 of FIG. 6.

Therefore, as illustrated in FIGS. 3, 4, and 9, each of the four stoppers 12-1, 12-2, 12-3, and 12-4 formed on the fixing member 10 may be formed to locate outside each of the four position determining portions 23-1, 23-2, 23-3, and 23-4 of the moving member 20, thereby limiting movement of the moving member 20 in the X and Y axis directions. Hereinafter, the stoppers 12 located outside the first, second, third, and fourth position determining portions 23-1, 23-2, 23-3, and 23-4 of the moving member 20 are referred to as first, second, third, and fourth stoppers 12-1, 12-2, 12-3, and 12-4, respectively.

For forming the four position determining portions 23-1, 23-2, 23-3, and 23-4, as illustrated in FIG. 6, portions of the outer circumferential surface of the lens holder 22 may be cut as planes. Each of the four stoppers 12-1, 12-2, 12-3, and 12-4 of the fixing member 10 may be formed to be in a line contact with each of the four position determining portions 23-1, 23-2, 23-3, and 23-4. For example, the stoppers 12 may be formed as a cylindrical post, a semicircular post, or a triangle post, etc.

Figure 5:
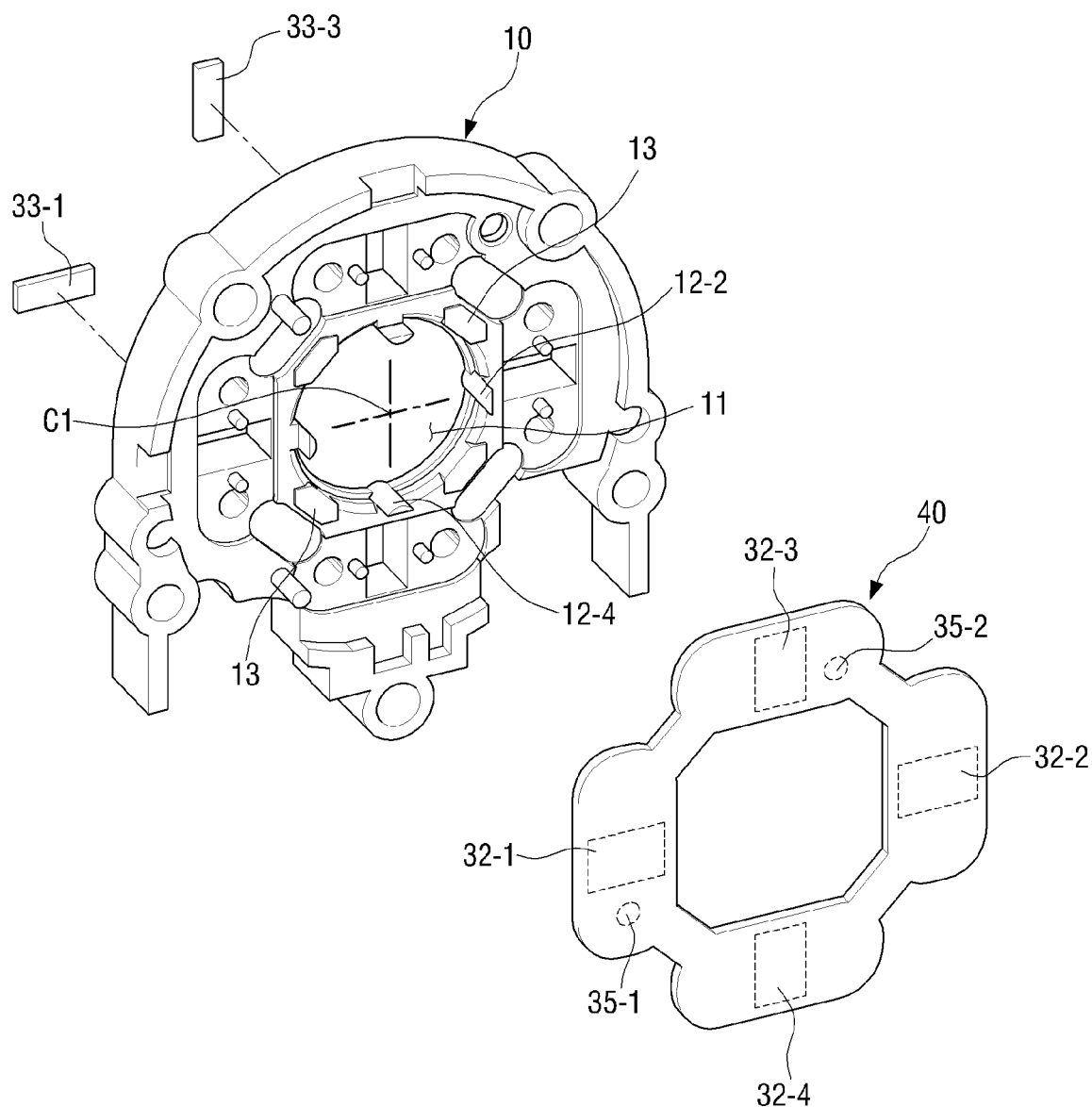
FIG. 5 is an exploded perspective view illustrating a fixing member of the image stabilizing apparatus of FIG. 2.

Also, a plurality of balls 25 may be disposed around the lens holder 22 on a surface of the moving member 20 on which the lens holder 22 is formed. The plurality of balls 25 may contact the fixing member 10 to remain a gap between the fixing member 10 and the moving member 20 in the optical axis direction, that is, in a Z-axis direction. Therefore, when the moving member 20 moves, the moving member 20 may be supported by the plurality of balls 25, thereby minimizing a friction force. For this, the fixing member 10, as illustrated in FIG. 5, may have a plurality of ball contacting portions 13 that is formed to contact the plurality of balls 25 of the moving member 20 at positions corresponding to the plurality of balls 25 thereof. In this exemplary embodiment, four balls 25 are disposed on the moving member 20, and on the fixing member 10 are formed four ball contacting portions 13 corresponding to the four balls 25.

The driving portion 30 may be formed to cause the moving member 20 to move according to the size of the hand-shake in the first direction perpendicular to the optical axis C or/and in the second direction perpendicular to both the optical axis C and the first direction. The driving portion 30 may comprise of a power source and include at least one magnet 31 disposed on the moving member 20, at least one coil 32 disposed on the fixing member 10 to face the magnet 31, and at least one yoke 33 disposed in the fixing member 10 spaced apart and below the coil 32.

The at least one magnet 31 may be formed substantially in a rectangular plate, and may comprise four magnets 31-1, 31-2, 31-3, and 31-4 that are disposed outside the four position determining portions 23-1, 23-2, 23-3, and 23-4 formed on the lens holder 22 of the moving member 20, respectively. Referring to FIG. 6, first and second magnets 31-1 and 31-2 may be disposed on the moving member 20 at the right and left sides of the lens holder 22 in the first direction, that is, the X axis direction. The third and fourth magnets 31-3 and 31-4 may be disposed on the moving member 20 at the up and down sides of the lens holder 22 in the second direction, that is, the Y axis direction. Therefore, the first and second magnets 31-1 and 31-2 and the first and second position determining portions 23-1 and 23-2 formed on the moving member 20 may form a straight line parallel to the X axis direction. Also, the third and fourth magnets 31-3 and 31-4 and the third and fourth position determining portions 23-3 and 23-4 formed on the moving member 20 may form a straight line parallel to the Y axis direction. The four balls 25 as described above may be disposed among the first to fourth magnets 31-1, 31-2, 31-3, and 31-4 on the moving member 20.

The yoke 33 and coil 32 may be disposed on the fixing member 10, and may be formed to cause the moving member 20 to linearly move in the X axis direction or in the Y axis direction. For this, the yoke 33 may be formed substantially in a bar shape, and, as illustrated in FIG. 9, may be disposed so that the lengthwise direction of the yoke 33 is parallel to the moving direction of the moving member 20. In other words, the first and second yokes 33-1 and 33-2 may be disposed parallel to the X axis direction, and the third and fourth yokes 33-3 and 33-4 may be disposed parallel to the Y axis direction.

Also, the yokes 33 may be formed to have a length shorter than that of the magnet 31 so that even when the moving member 20 moves, the yokes 33 can form magnetic force lines with the magnets 31 of the moving member 20. That is, the length L1 of the magnet 31 may be longer than the length L2 of the yoke 33. Also, the width W2 of the yoke 33 may be formed to be narrower than the width W1 of the magnet 31. If the width W2 of the yoke 33 is narrower than the width W1 of the magnet 31, the moving member 20 can be controlled to move substantially linearly with respect to the fixing member 10 by adjusting current or/and voltage applied to the coil 32 disposed between the yoke 33 and the magnet 31 without an independent movement guiding member to guide a linear movement of the moving member 20, such as guide pins. The narrower the width W2 of the yoke 33, the closer to the straight line the moving passage of the moving member 20 becomes. However, the narrower the width W2 of the yoke 33, the smaller the magnetic force between the magnet 31 and the yoke 33 becomes so that the moving member 20 is very likely to change in the optical axis direction C by the hand-shake. Therefore, the width W2 of the yoke 33 may be determined corresponding to the size of the moving member 20 so that the moving member 20 is not changed in the optical axis direction C and is linearly moved. As a reference, for clearly showing the relationship between the magnets 31 of the moving member 20 and the yokes 33 of the fixing member 10 and the relationship between the position determining portions 23 of the moving member 20 and the stoppers 12 of the fixing member 10, in FIG. 9, the fixing member 10 is illustrated to have only the yokes 33 and stoppers 12.

Furthermore, the movement of the moving member 20 with respect to the fixing member 10 in the optical axis C direction, that is, the movement in the Z axis direction in FIG. 1 may be limited by the magnetic force between the magnets 31 and the yokes 33 and the plurality of balls 25. In other words, the magnetic force operating between the magnets 31 of the moving member 20 and the yokes 33 of the fixing member 10 may attract the moving member 20 to the fixing member 10, whereas the plurality of balls 25 may allow the moving member 20 not to contact with the fixing member 10 and may allow the moving member 20 and the fixing member 10 to remain a predetermined gap therebetween. As a result, the moving member 20 does not move in the optical axis C direction.

A magnetic zone 30a to include the interactions between the magnets 31, yokes 33, and coils 32 is illustrated in FIG. 4.

The four coils 32 corresponding to each of the first to fourth yokes 33-1, 33-2, 33-3, and 33-4, that is, first to fourth coils 32-1, 32-2, 32-3, and 32-4 may be disposed independently between the first to fourth magnets 31-1, 31-2, 31-3, and 31-4 and the first to fourth yokes 33-1, 33-2, 33-3, and 33-4. Alternatively, the first to fourth coils 32-1, 32-2, 32-3, and 32-4, as illustrated in FIG. 5, may be formed as one printed circuit board 40 disposed between the first to fourth magnets 31-1, 31-2, 31-3, and 31-4 and the first to fourth yokes 33-1, 33-2, 33-3, and 33-4. At this time, the four coils 32-1, 32-2, 32-3, and 32-4 may be disposed on the rear surface of the printed circuit board 40 facing the fixing member 10 or on the front surface of the printed circuit board 40 facing the opposite side of the fixing member 10. Alternatively, the four coils 32-1, 32-2, 32-3, and 32-4 may be embedded within the printed circuit board 40. In FIG. 5 the four coils 32-1, 32-2, 32-3, and 32-4 are embedded within the printed circuit board 40. The printed circuit board 40 may be connected to the control portion 6 using flexible cables 42 (see FIG. 2).

Furthermore, a magnetic sensor 35 may be disposed in the moving member 20 (not illustrated) to detect change of magnetic fields generated by the first to fourth coils 32-1, 32-2, 32-3, and 32-4. A hall sensor may be used as the magnetic sensor 35. In this exemplary embodiment, a first magnetic sensor 35-1 to detect change of the magnetic field generated by the first and second coils 32-1 and 32-2 and a second magnetic sensor 35-2 to detect change of the magnetic field generated by the third and fourth coils 32-3 and 32-4 may be disposed in the moving member 20. The control portion 6 may use the first and second magnetic sensors 35-1 and 35-2 to detect whether the position determining portions 23 of the moving member 20 contact the stoppers 12 of the fixing member 10. The first and second magnetic sensors 35-1 and 35-2 may be formed as a separate sensor printed circuit board (not illustrated) and may be disposed to detect change of the magnetic fields of the first to fourth coils 32-1, 32-2, 32-3, and 32-4. Alternatively, the first and second magnetic sensors 35-1 and 35-2 may be formed integrally with the printed circuit board 40, as illustrated in FIG. 5, in which the four coils 32-1, 32-2, 32-3, and 32-4 are formed.

Figure 7:
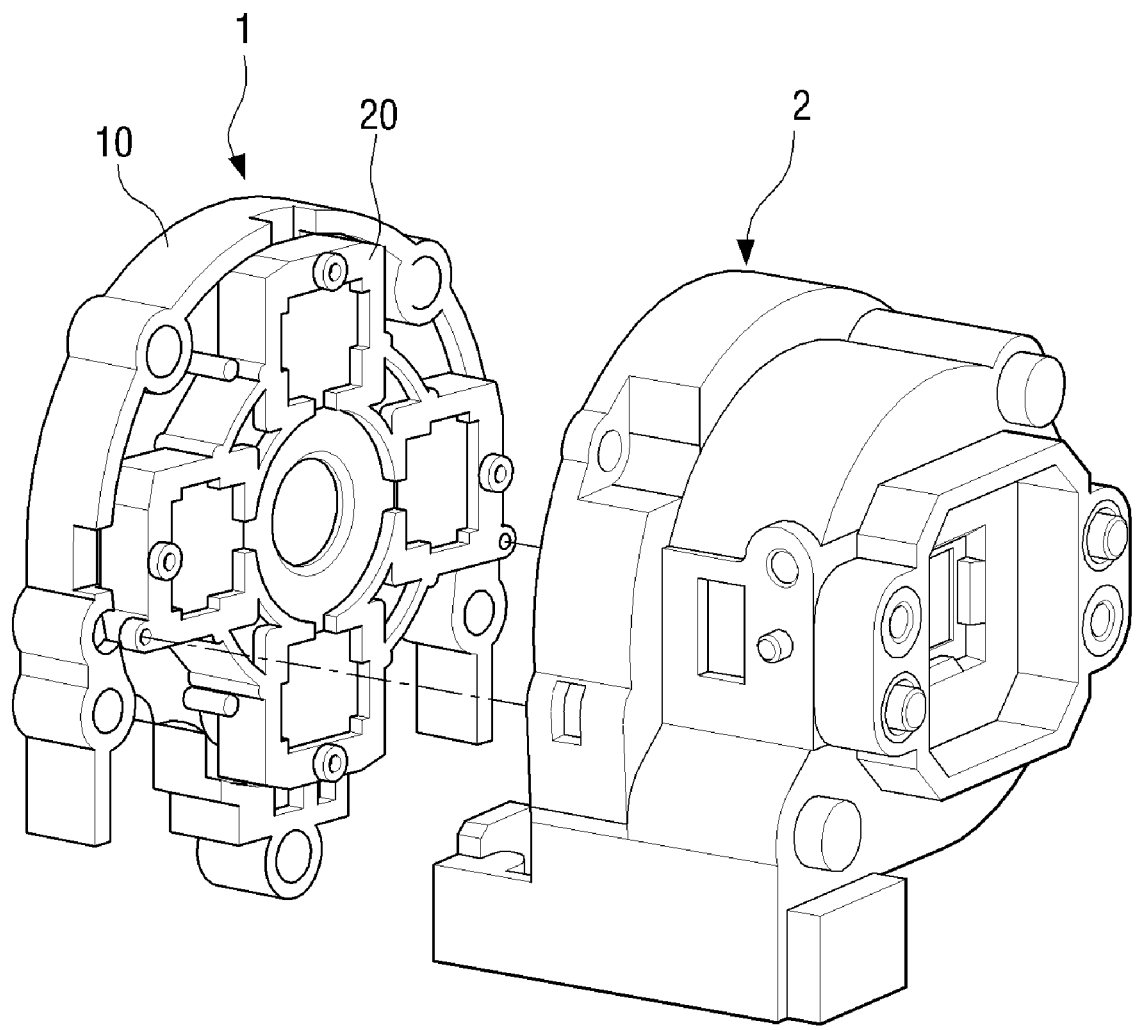
FIG. 7 is a perspective view illustrating an image stabilizing apparatus according to an exemplary embodiment of the present general inventive concept before being disposed in an image sensor mount.
Figure 8:
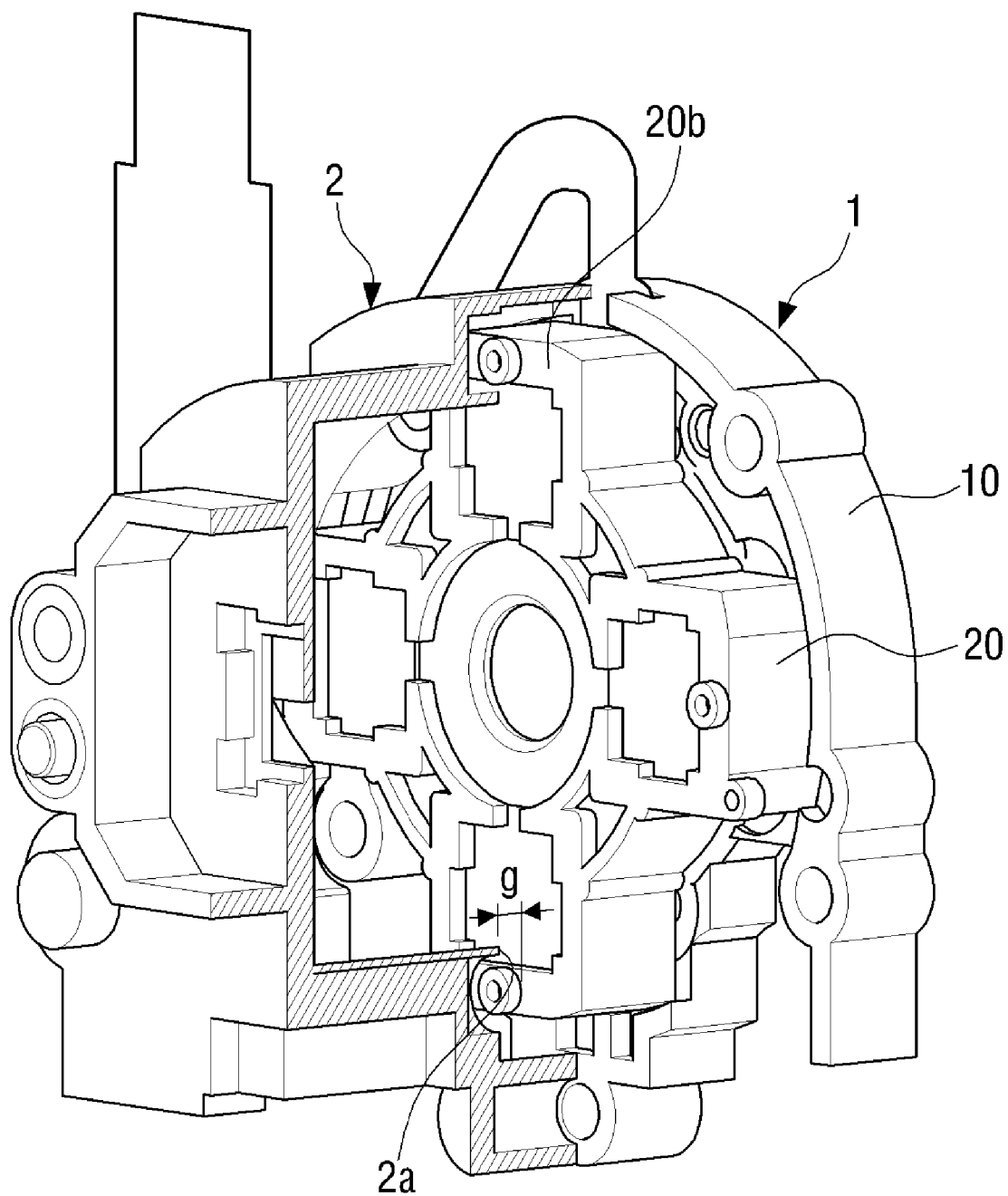
FIG. 8 is a partially cutaway perspective view illustrating an image stabilizing apparatus according to an exemplary embodiment of the present general inventive concept disposed in an image sensor mount.

FIG. 7 is a perspective view illustrating the image stabilizing apparatus 1 according to an exemplary embodiment of the present general inventive concept before being disposed in the image sensor mount 2. FIG. 8 is a partially cutaway perspective view illustrating the image stabilizing apparatus 1 according to an exemplary embodiment of the present general inventive concept disposed in the image sensor mount 2.

The image stabilizing apparatus 1 may be disposed in the image sensor mount 2 constituting the lens assembly 5. That is, the fixing member 10 of the image stabilizing apparatus 1 may be fixed to the image sensor mount 2. At this time, the fixing member 10 of the image stabilizing apparatus 1 may be disposed so that the center C1 of the through hole 11 of the fixing member 10 is aligned with the optical axis C of the image sensor mount 2. And the moving member 20 of the image stabilizing apparatus 1 may be disposed between the fixing member 10 and the image sensor mount 2. At this time, as illustrated in FIG. 8, there may be a predetermined gap g between the moving member 20 and the image sensor mount 2 so that when the moving member 20 moves, the moving member 20 does not interfere with the image sensor mount 2. The size of the gap g between a supporting end 2a of the image sensor mount 2 and a rear surface 20b of the moving member 20 may be as narrow as possible. Therefore, even when the image pickup apparatus 100 receives a vibration such as the hand-shake so the moving member 20 is moved toward the image sensor 8 in the optical axis C direction, that is, in the Z axis direction, the maximum amount of the movement in the Z axis direction of the moving member 20 may be limited as the size of the gap g between the supporting end 2a of the image sensor mount 2 and the rear surface 20b of the moving member 20.

Also, when the moving member 20 is moved in the Z axis direction by the hand-shake, etc., the movement of the moving member 20 in the Z axis direction toward the object lens mount 3 may be limited by the magnetic force generated between the magnets 31 of the moving member 20 and the yokes 33 of the fixing member 10 and the plurality of balls 25 disposed on the moving member 20. Therefore, even when the image pickup apparatus 100 is vibrated by the hand-shake, etc., both the movement toward the object lens mount 3 and the movement toward the image sensor mount 2 of the moving member 20 in the Z axis direction may be limited by the magnetic force between the magnets 31 of the moving member 20 and the yokes 33 of the fixing member 10. As a result, the moving member 20 may not move in the Z axis direction. Even if an impact force larger than the magnetic force between the magnets 31 and the yokes 33 is applied by the hand-shake applying to the image pickup apparatus 100, the amount of the movement in the Z axis direction of the moving member 20 is limited by the size of the gap g between the supporting end 2a of the image sensor mount 2 and the rear surface 20b of the moving member 20. Therefore, after the impact force is disappeared, the moving member 20 may easily restore to its original position.

Also, the object lens mount 3 may be disposed on the other surface of the fixing member 10 on which the moving member 20 is not disposed. When the object lens mount 3 is disposed on the fixing member 10, the optical axis C of the object lens mount 3, the center C1 of the through hole 11 of the fixing member 10, and the optical axis C of the image sensor mount 2 may be aligned with each other. Therefore, when the lens assembly 5 is not vibrated, light that is reflected by the object and enters through the object lens of the object lens mount 3 may accurately form an image of the object on the image sensor 8 disposed in the image sensor mount 2.

Hereinafter, a method for setting an optical center of the image pickup apparatus 100 using the image stabilizing apparatus 1 according to an exemplary embodiment of the present general inventive concept having the structure as described above will be explained in detail.

When an electric power is applied to the image pickup apparatus 100, the control portion 6 may control the driving portion 30 of the image stabilizing apparatus 1 so that the optical axis C2 of the compensating lens 21 of the moving member 20 is aligned with the center C1 of the through hole 11 of the fixing member 10. This operation is described in more detail hereinafter.

Figure 10A:
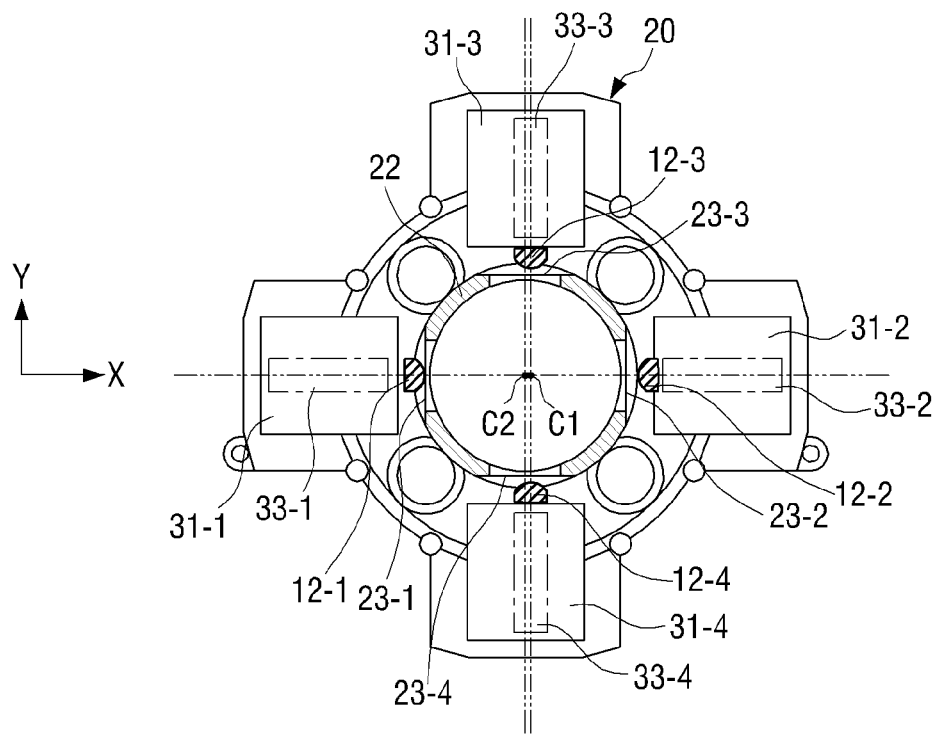
FIGS. 10A through 10D are views for explaining a method to center a moving member of an image stabilizing apparatus according to an exemplary embodiment of the present general inventive concept.
Figure 10B:
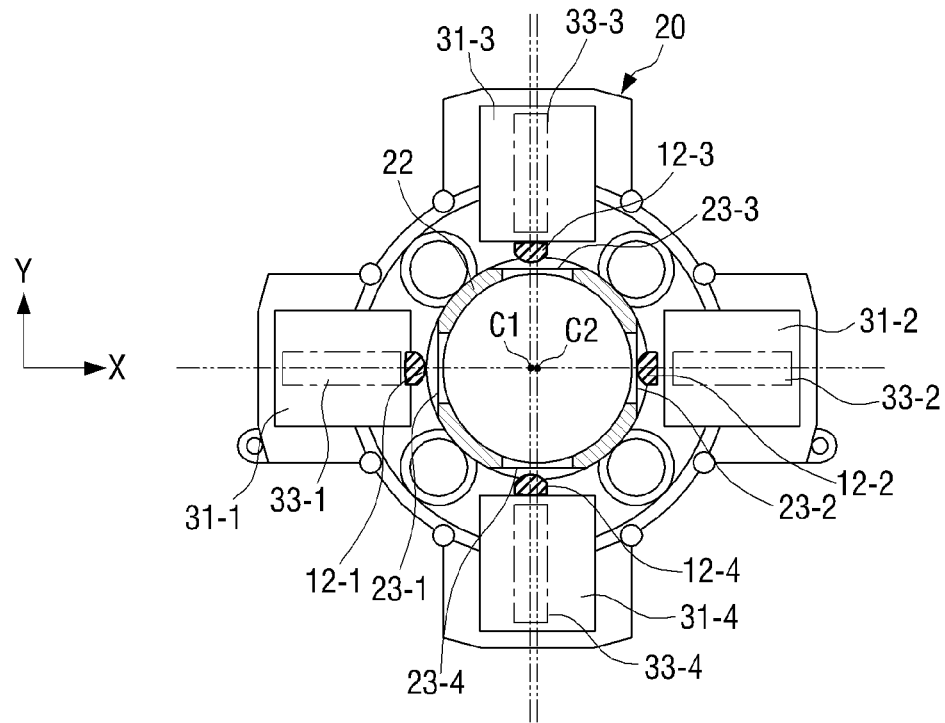

First, the control portion 6 may cause the electric power to be usable with the first and second coils 32-1 and 32-2 so that the moving member 20 is moved to the first stopper 12-1 of the fixing member 10 in the X axis direction. After the moving member 20 is moved by a predetermined distance, as illustrated in FIG. 10A, the first position determining portion 23-1 of the moving member 20 may contact the first stopper 12-1 of the fixing member 10 so that the moving member 20 cannot be moved further in the same direction. At this time, the control portion 6 may use the first magnetic sensor 35-1 to detect whether the first position determining portion 23-1 of the moving member 20 contacts the first stopper 12-1 of the fixing member 10. If the moving member 20 is not moved, the control portion 6 may control the electric power usable with the first and second coils 32-1 and 32-2 so that the moving member 20 is moved to the opposite direction, that is, to the second stopper 12-2 of the fixing member 10 in the X axis direction. After the moving member 20 is moved to the second stopper 12-2 by a predetermined distance, as illustrated in FIG. 10B, the second position determining portion 23-2 of the moving member 20 may contact the second stopper 12-2 of the fixing member 10 so that the moving member 20 cannot be moved further in the same direction. At this time, the control portion 6 may use the first magnetic sensor 35-1 to detect whether the second position determining portion 23-2 of the moving member 20 contacts the second stopper 12-2 of the fixing member 10. If the moving member 20 is not moved, the control portion 6 may use measuring values of the first magnetic sensor 35-1 to calculate the middle value of the distance between the first and second stoppers 12-1 and 12-2 and may save the middle value as a center of the X axis direction.

Figure 10C:
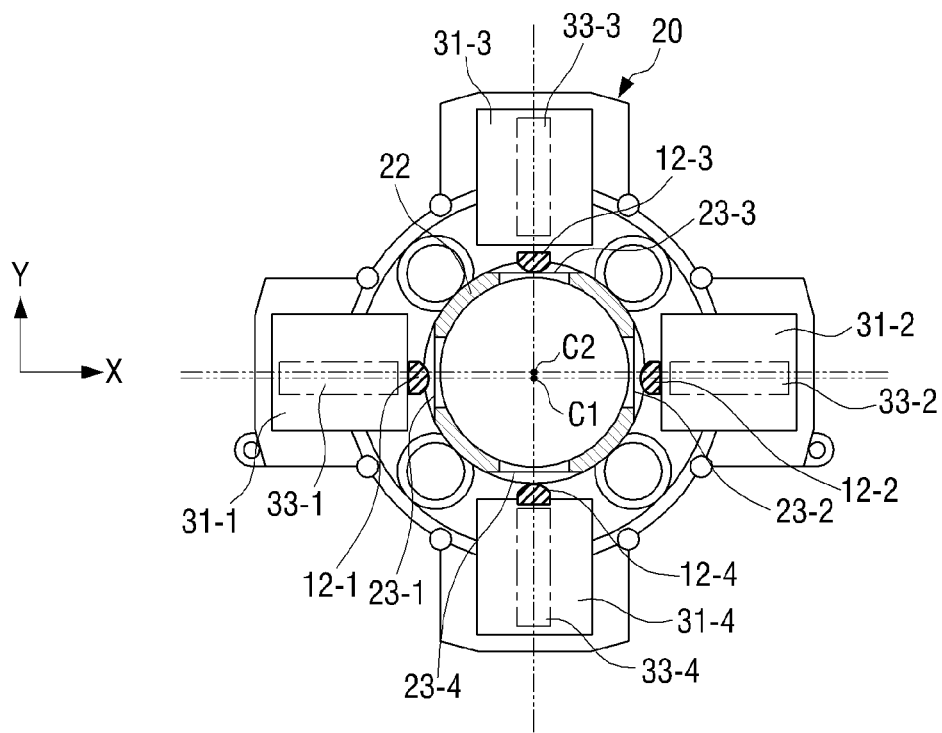
Figure 10D:
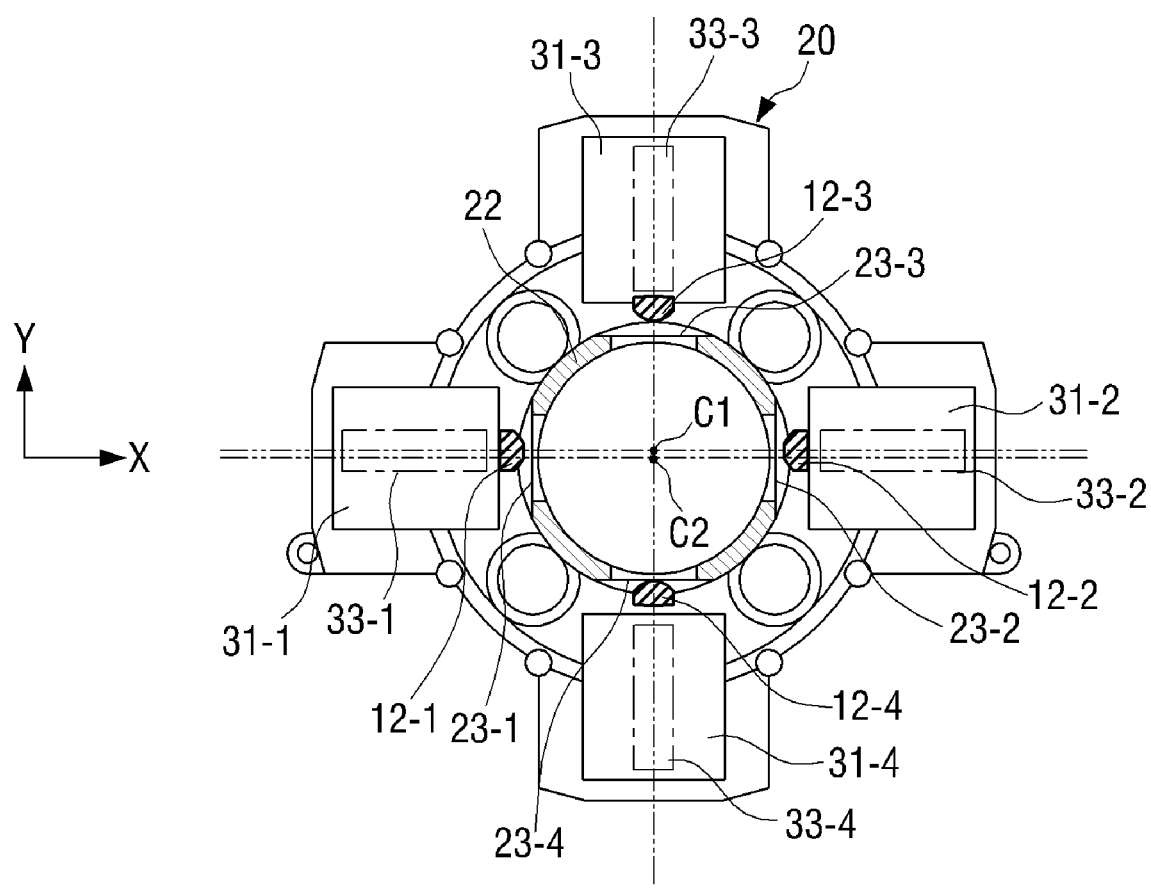

After that, the control portion 6 may cause the electric power to be applied to the third and fourth coils 32-3 and 32-4 so that the moving member 20 is moved to the third stopper 12-3 of the fixing member 10 in the Y axis direction. After the moving member 20 is moved by a predetermined distance, as illustrated in FIG. 10C, the third position determining portion 23-3 of the moving member 20 may contact the third stopper 12-3 of the fixing member 10 so that the moving member 20 cannot be moved further in the same direction. At this time, the control portion 6 may use the second magnetic sensor 35-2 to detect whether the third position determining portion 23-3 of the moving member 20 contacts the third stopper 12-3 of the fixing member 10. If the moving member 20 is not moved, the control portion 6 may control the electric power applied to the third and fourth coils 32-3 and 32-4 so that the moving member 20 is moved to the opposite direction, that is, to the fourth stopper 12-4 of the fixing member 10 in the Y axis direction. After the moving member 20 is moved to the fourth stopper 12-4 by a predetermined distance, as illustrated in FIG. 10D, the fourth position determining portion 23-4 of the moving member 20 may contact the fourth stopper 12-4 of the fixing member 10 so that the moving member 20 cannot be moved further in the same direction. At this time, the control portion 6 may use the second magnetic sensor 35-2 to detect whether the fourth position determining portion 23-4 of the moving member 20 contacts the fourth stopper 12-4 of the fixing member 10. If the moving member 20 is not moved, the control portion 6 may use measuring values of the second magnetic sensor 35-2 to calculate the middle value of the distance between the third and fourth stoppers 12-3 and 12-4 and may save the middle value as a center of the Y axis direction.

After that, the control portion 6 may use the center of the X axis direction and the center of the Y axis direction to determine the center of the moving member 20, that is, the center C2 of the compensating lens 21. Then the control portion 6 may set the determined center of the compensating lens 21 as the optical center C of the lens assembly 5, that is, the image pickup apparatus 100. Therefore, when hand-shake occurs in the image pickup apparatus 100 while taking a picture, the control portion 6 may control the image stabilizing apparatus 1 based on the optical center C to compensate the hand-shake so as to form a stable image. In other words, the control portion 6 may cause the moving member 20 of the image stabilizing apparatus 1 to move corresponding to the size of the movement of the image pickup apparatus 100 detected by the hand-shake detecting portion 7, such as a gyro sensor, etc., so as to form a stable image on the image sensor 8.

With the image stabilizing apparatus usable with an image pickup apparatus according to an exemplary embodiment of the present general inventive concept, the through hole of the fixing member may be disposed to be aligned with the optical axis of the lens assembly. Therefore, if the center of the moving member, namely, the optical center of the compensating lens is determined based on the four stoppers formed on the outer circumferential surface of the through hole of the fixing member and the four position determining portions formed on the outer circumferential surface of the lens holder of the moving member, the optical axis of the compensating lens of the image stabilizing apparatus may accurately coincide with the optical axis of the image pickup apparatus.

Also, with the image stabilizing apparatus usable with an image pickup apparatus according to an exemplary embodiment of the present general inventive concept, the four stoppers and the four position determining portions to determine a mechanical center of the image stabilizing apparatus are formed near the compensating lens and independent movement guiding members, such as a guide pin, etc., are not required. Therefore, the size of the image stabilizing apparatus can be minimized.

Furthermore, with the image stabilizing apparatus usable with an image pickup apparatus according to an exemplary embodiment of the present general inventive concept, the four stoppers used to determine the mechanical center of the image stabilizing apparatus may be formed to adjoin the through hole of the fixing member and may be formed integrally with the through hole. The four position determining portions used to determine the mechanical center of the image stabilizing apparatus may be formed to adjoin the lens holder of the moving member and may be formed integrally with the lens holder. Therefore, the center of the image stabilizing apparatus determined by usage of the four stoppers and the four position determining portions may be very accurate.

Although a few exemplary embodiments of the present general inventive concept have been illustrated and described, it will be appreciated by those skilled in the art that changes may be made in these exemplary embodiments without departing from the principles and spirit of the general inventive concept, the scope of which is defined in the appended claims and their equivalents.

What is claimed is:

1. An image stabilizing apparatus usable with an image pickup apparatus comprising:
   a fixing member disposed to a lens assembly, the fixing member having a through hole of which a center aligns with an optical axis of the lens assembly;
   a moving member disposed to move perpendicular to the optical axis with respect to the fixing member, the moving member having a lens holder projecting in a direction of the optical axis in a hollow cylindrical shape to hold a compensating lens;
   a driving portion causing the moving member to move in a first direction perpendicular to the optical axis and in a second direction perpendicular to the optical axis and the first direction corresponding to a size of a handshake;
   four position determining portions formed in the first direction and the second direction on an outer circumferential surface of the lens holder of the moving member; and
   four stoppers projecting from an outer circumferential surface of the through hole of the fixing member to the moving member, each of the four stoppers disposed outside, and in line contact with, each of the four position determining portions to inhibit movement of the moving member in a direction perpendicular to the optical axis of the lens assembly.

2. The image stabilizing apparatus of claim 1, wherein the position determining portions comprise:
   plane surfaces formed on portions of the outer circumferential surface of the lens holder.

3. The image stabilizing apparatus of claim 2, wherein each of the stoppers is formed to be in a line contact with each of the position determining portions.

4. The image stabilizing apparatus of claim 1, wherein the driving portion comprises:

at least one magnet disposed on the moving member;
at least one coil disposed on the fixing member to face the at least one magnet; and
at least one yoke disposed in the fixing member below the at least one coil.

5. The image stabilizing apparatus of claim 4, wherein the at least one magnet comprises:
first, second, third, and fourth magnets disposed outside each of the four position determining portions of the lens holder of the moving member, the first and second magnets are disposed in the first direction, and the third and fourth magnets are disposed in the second direction.

6. The image stabilizing apparatus of claim 5, wherein the yoke and coil are formed to cause the moving member to linearly move in the first direction and in the second direction.

7. The image stabilizing apparatus of claim 6, wherein the yoke is formed substantially in a bar shape, and the yoke is disposed so that a lengthwise direction thereof is parallel with a moving direction of the moving member.

8. The image stabilizing apparatus of claim 4, wherein a plurality of balls is disposed between the moving member and the fixing member.

9. The image stabilizing apparatus of claim 8, wherein movement of the moving member in the optical axis direction is limited by the plurality of balls and a magnetic force between the at least one magnet and yoke.

10. The image stabilizing apparatus of claim 8, wherein the plurality of balls is disposed on the moving member, and a plurality of ball contacting portions, which the plurality of balls contacts, is formed on the fixing member.

11. The image stabilizing apparatus of claim 5, wherein the at least one coil comprises:
first to fourth coils corresponding to the first to fourth magnets, and the first to fourth coils are formed integrally with a printed circuit board.

12. The image stabilizing apparatus of claim 1, further comprising:
a sensor to detect whether the position determining portions of the moving member contact the stopper of the fixing member.

13. The image stabilizing apparatus of claim 12, wherein the sensor comprises:
a hall sensor.

14. An image pickup apparatus, comprising:
a lens assembly;
an image stabilizing apparatus to compensate hand-shake of the image pickup apparatus, the image stabilizing apparatus comprising:
a fixing member disposed to the lens assembly, the fixing member having a through hole of which a center aligns with an optical axis of the lens assembly;
a moving member disposed to move perpendicular to the optical axis with respect to the fixing member, the moving member having a lens holder projecting in a direction of the optical axis in a hollow cylindrical shape to hold a compensating lens;
a driving portion causing the moving member to move in a first direction perpendicular to the optical axis and in a second direction perpendicular to the optical axis and the first direction corresponding to a size of the hand-shake;
four position determining portions formed in the first direction and the second direction on an outer circumferential surface of the lens holder of the moving member; and
four stoppers projecting from an outer circumferential surface of the through hole of the fixing member to the moving member, each of the four stoppers disposed outside, and in line contact with, each of the four position determining portions to inhibit movement of the moving member in a direction perpendicular to the optical axis of the lens assembly; and
an image sensor to convert light passed through the lens assembly and the image stabilizing apparatus into electrical signals.

15. An image stabilizing apparatus usable with an image pickup apparatus, comprising:
a fixing member having a lens assembly holding a lens;
a moving member disposed to be movable with respect to the fixing member, and having a lens holder holding another lens;
a driving portion formed at a position with the fixing member and the moving member to move the moving member with respect to the fixing member;
a plurality of determining portions formed on the moving member between the moving member and lens holders to correspond to a plurality of stoppers; and
the plurality of stoppers formed on the fixing member at regular intervals on an outer circumferential surface of a through hole of the fixing member of which a center aligns with an optical axis of the lens assembly, between the lens and the driving portion and in line contact with each of the plurality of determining portions to inhibit movement of the moving member in a direction perpendicular to the optical axis of the lens assembly.

16. A vibration reduction unit usable with a photographic apparatus to stabilize images captured therein, comprising:
a securing mechanism attached to a lens assembly, where the lens assembly provides an optical axis at the center thereof;
a movable mechanism to rotate about the optical axis, where the movable mechanism includes a compensating lens positioned perpendicular and within the path of the optical axis;
a power source to move the movable member in at least one direction perpendicular to the optical axis, where the movable mechanism is moved in proportion to vibration applied to the photographic apparatus; and
at least four stoppers positioned on the securing mechanism and propagating therefrom to provide precise alignment between the center of the compensating lens and the optical center of the photographic apparatus,
the at least four stoppers in line contact with at least four position determining units formed on an outer circumferential surface of a through hole of the movable mechanism, a center of the through hole aligning with the optical axis of the lens assembly, and the at least four stoppers inhibiting movement of the moving member in a direction perpendicular to the optical axis of the lens assembly.

17. The vibration reduction unit of claim 16, wherein the power source comprises:
at least one magnet disposed on the movable mechanism;
at least one coil disposed on the securing mechanism and facing the at least one magnet; and
at least one yoke disposed in the securing mechanism spaced apart from the coil.

18. The vibration reduction unit of claim 16, wherein the movable mechanism has a lens holder projecting in a direction of the optical axis in a hollow cylindrical shape to hold the compensating lens.

* * * * *